April 24, 1934. J. COYLE 1,956,344
SOLDERING MACHINE
Filed July 26, 1932 10 Sheets-Sheet 1
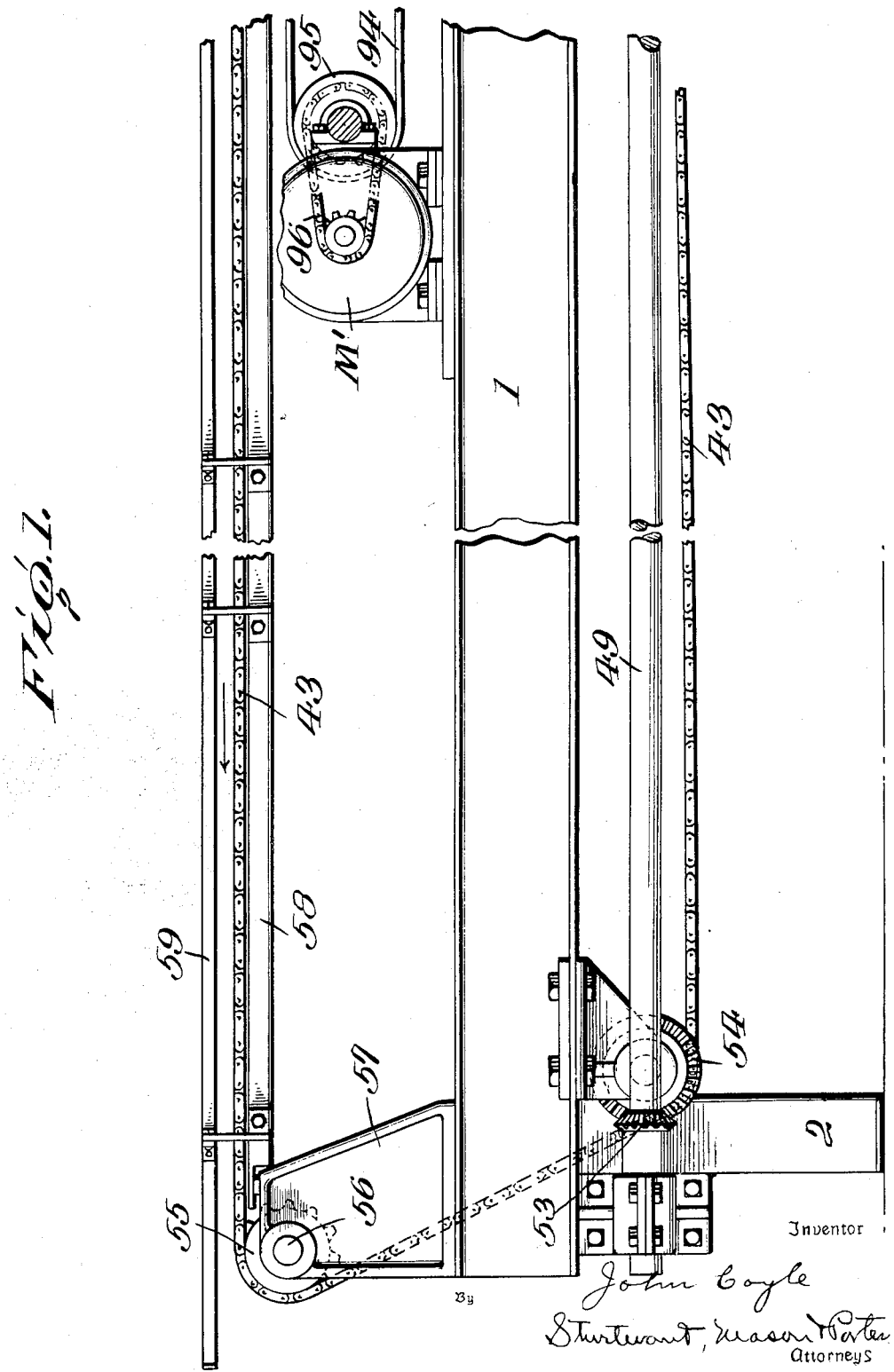

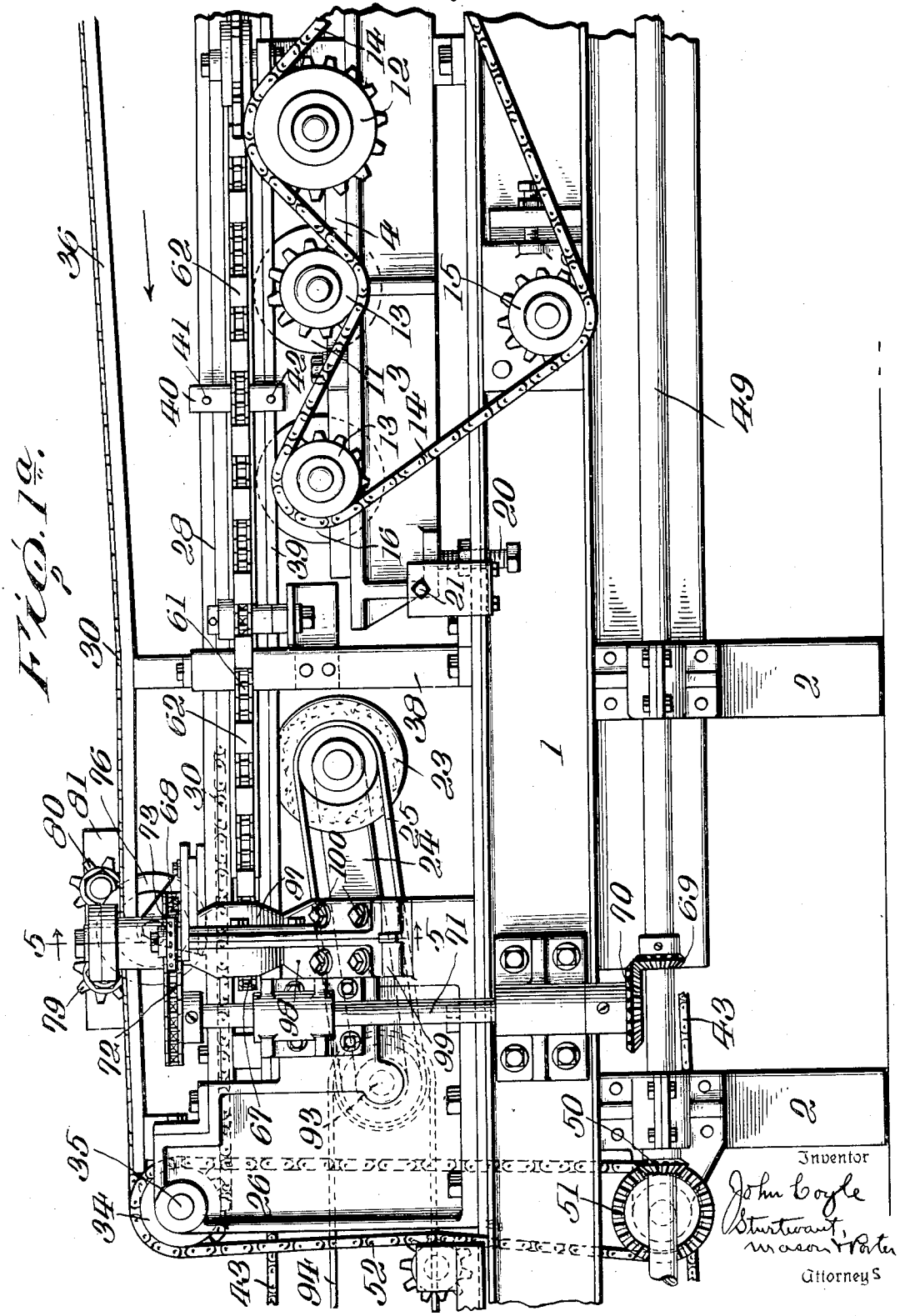

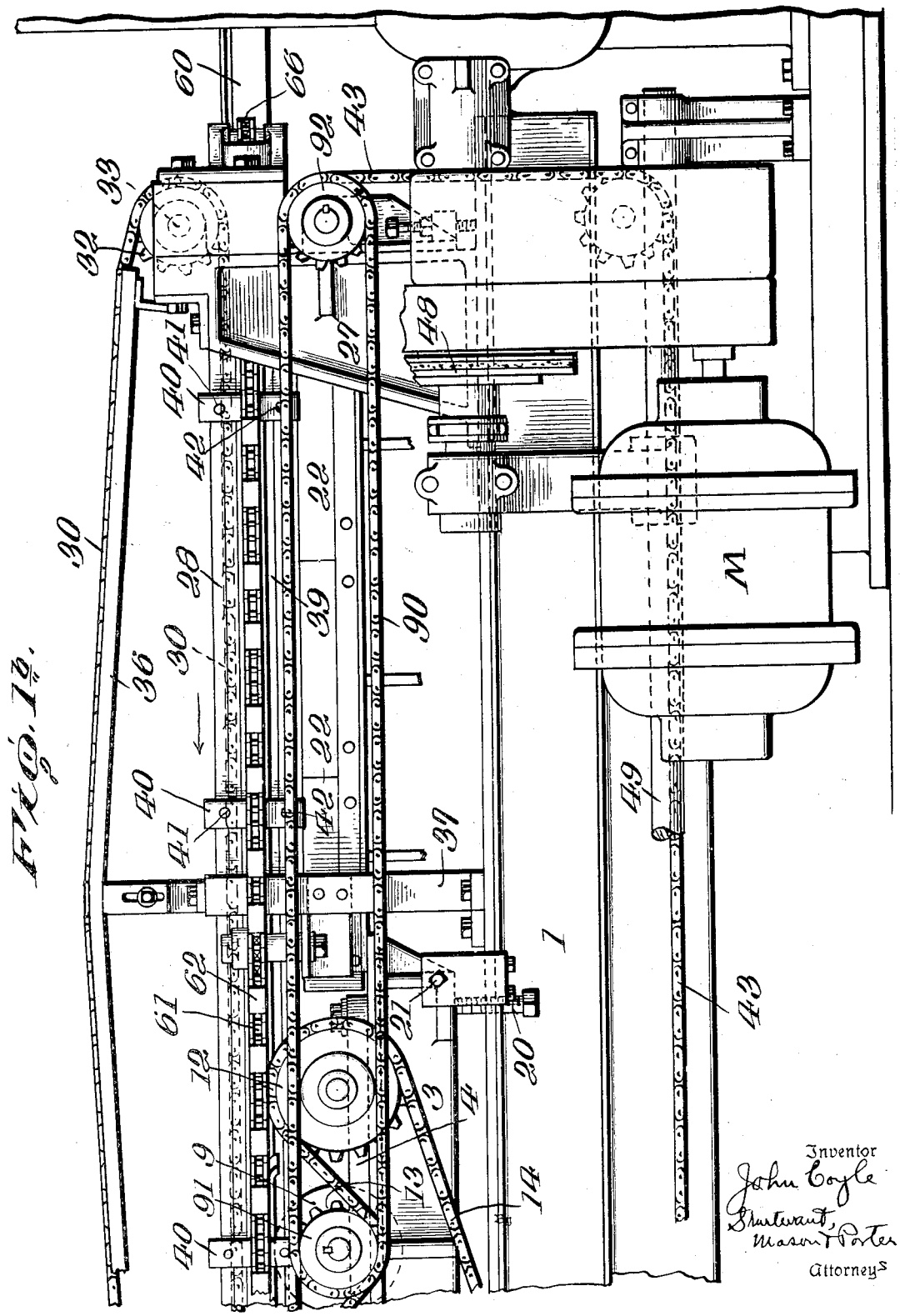

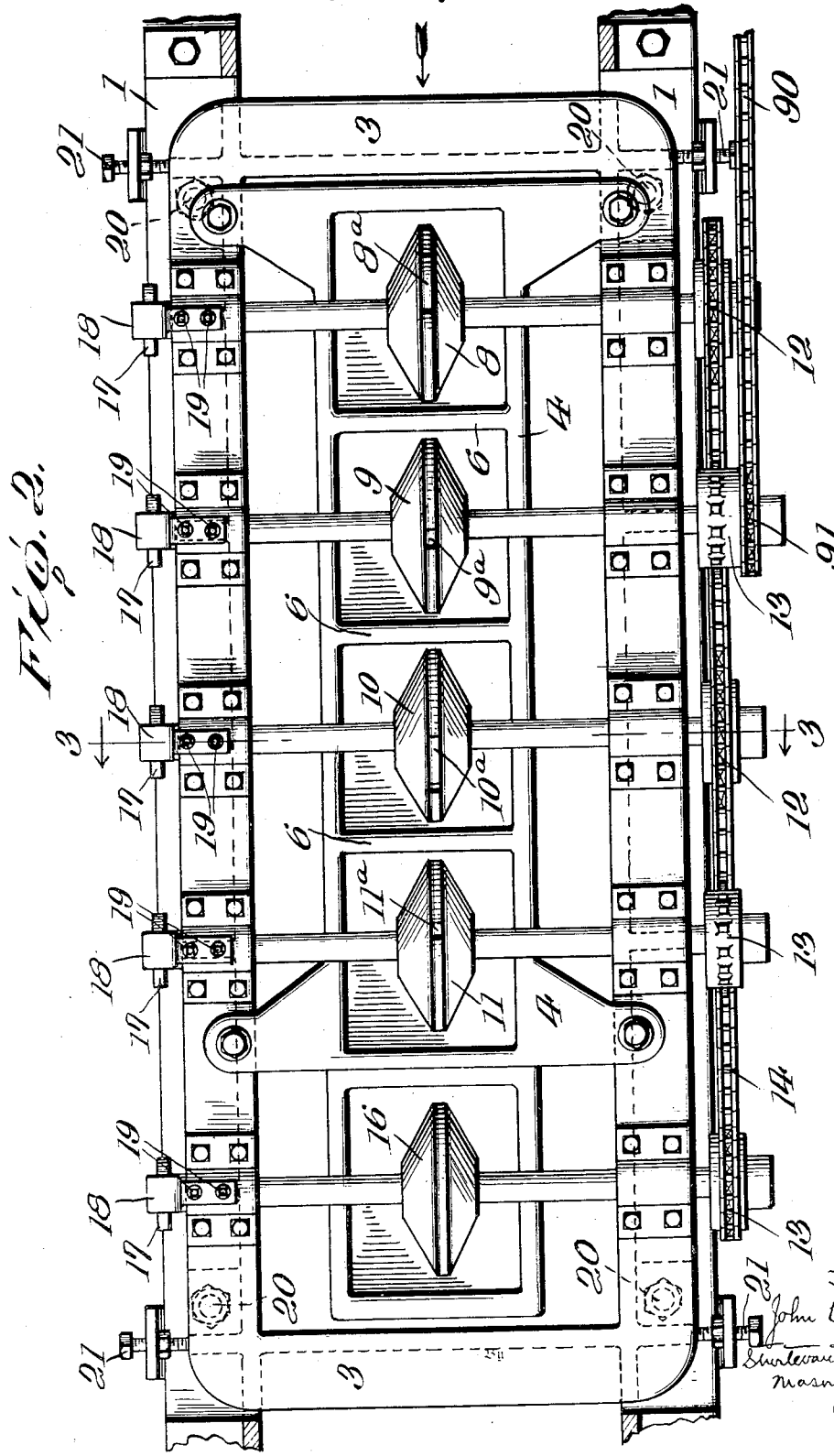

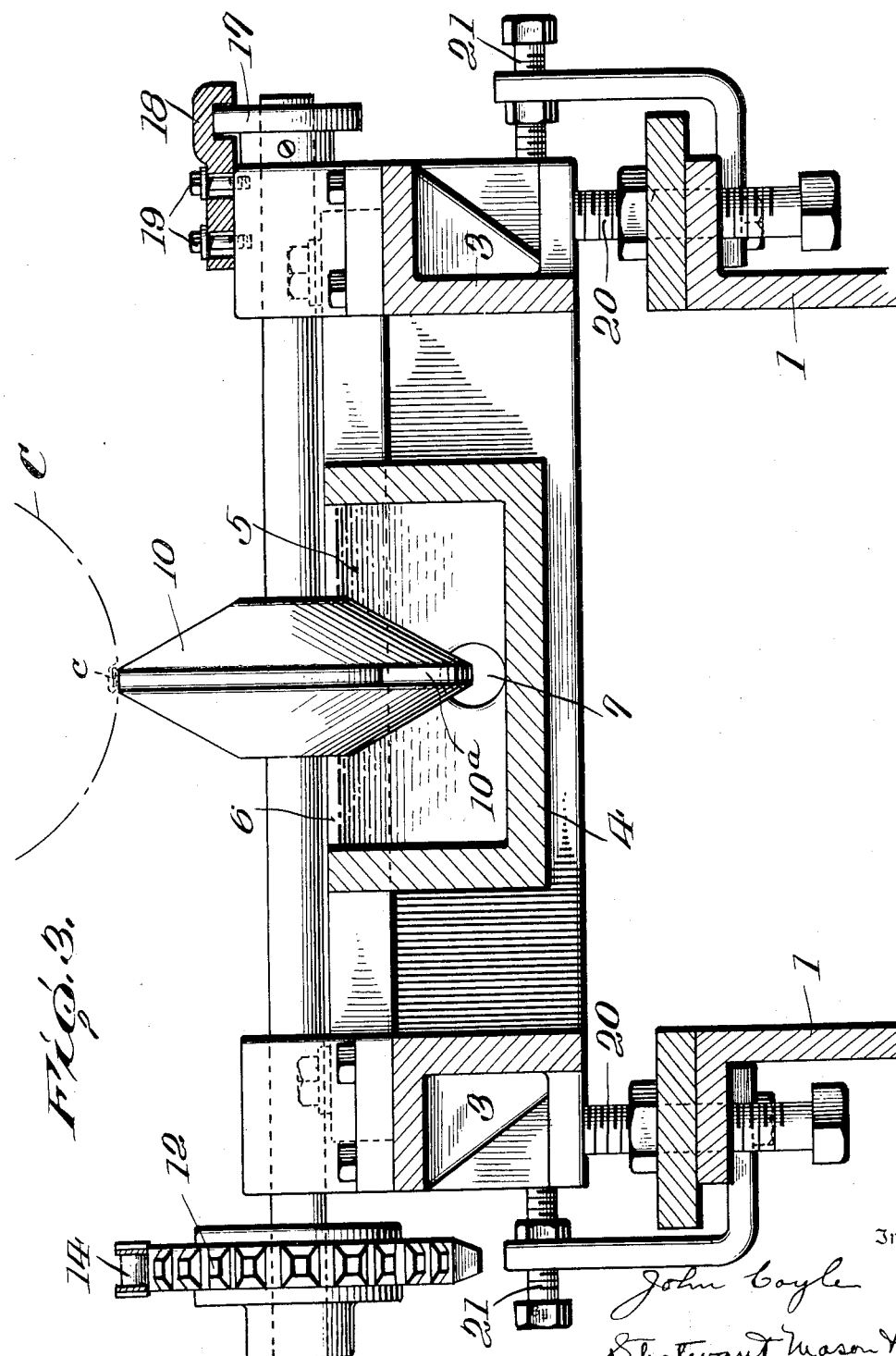

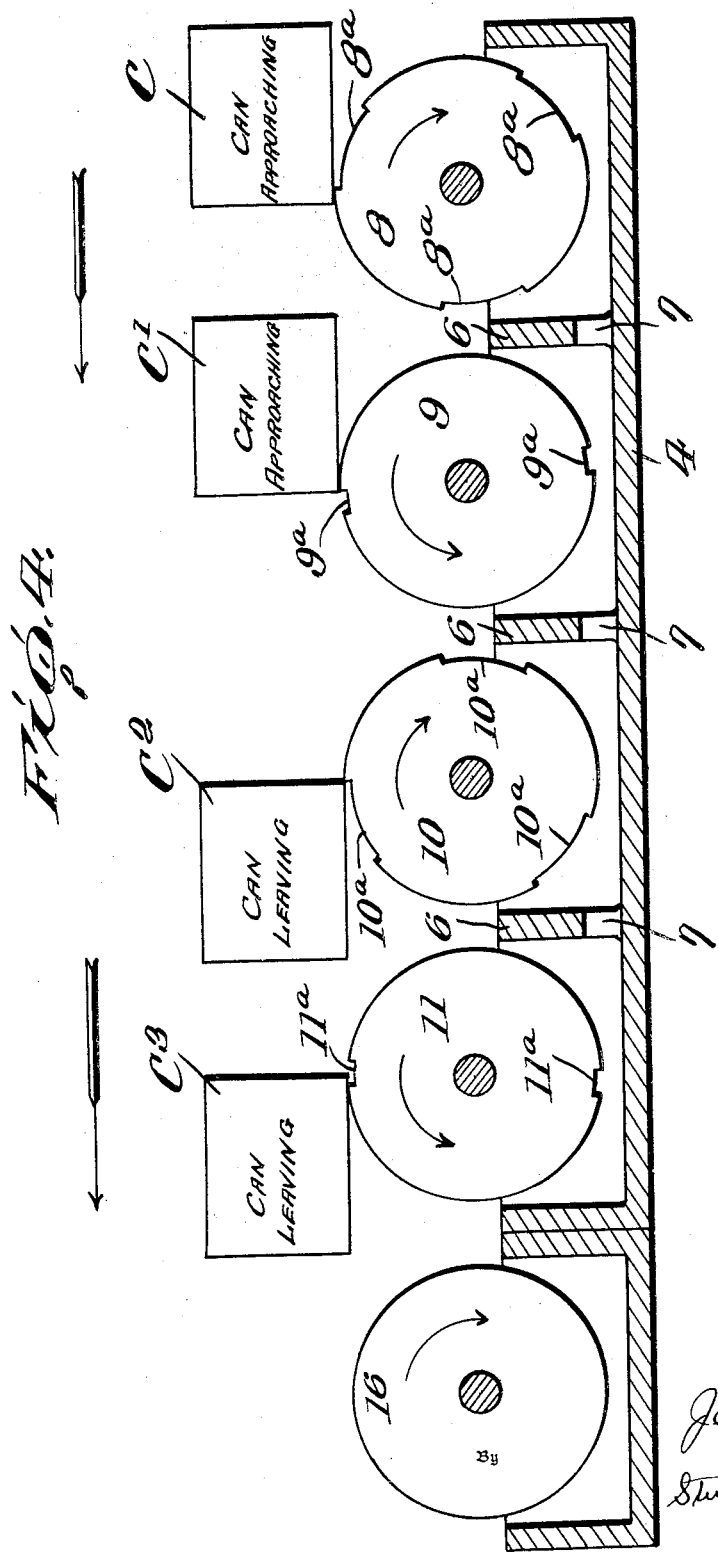

April 24, 1934. J. COYLE 1,956,344
SOLDERING MACHINE
Filed July 26, 1932 10 Sheets-Sheet 7
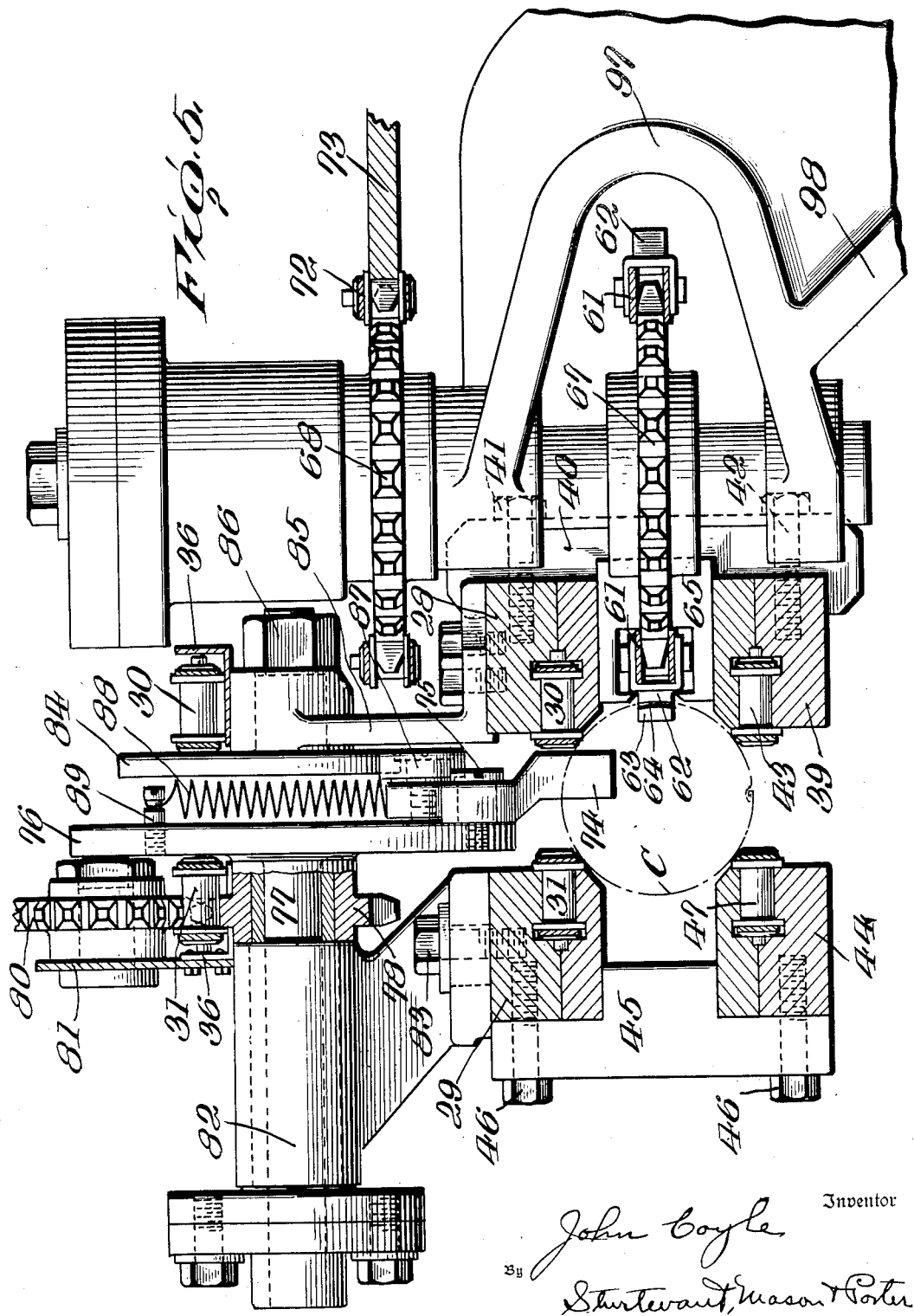
Inventor
John Coyle
By
Sturtevant, Mason & Porter
Attorneys

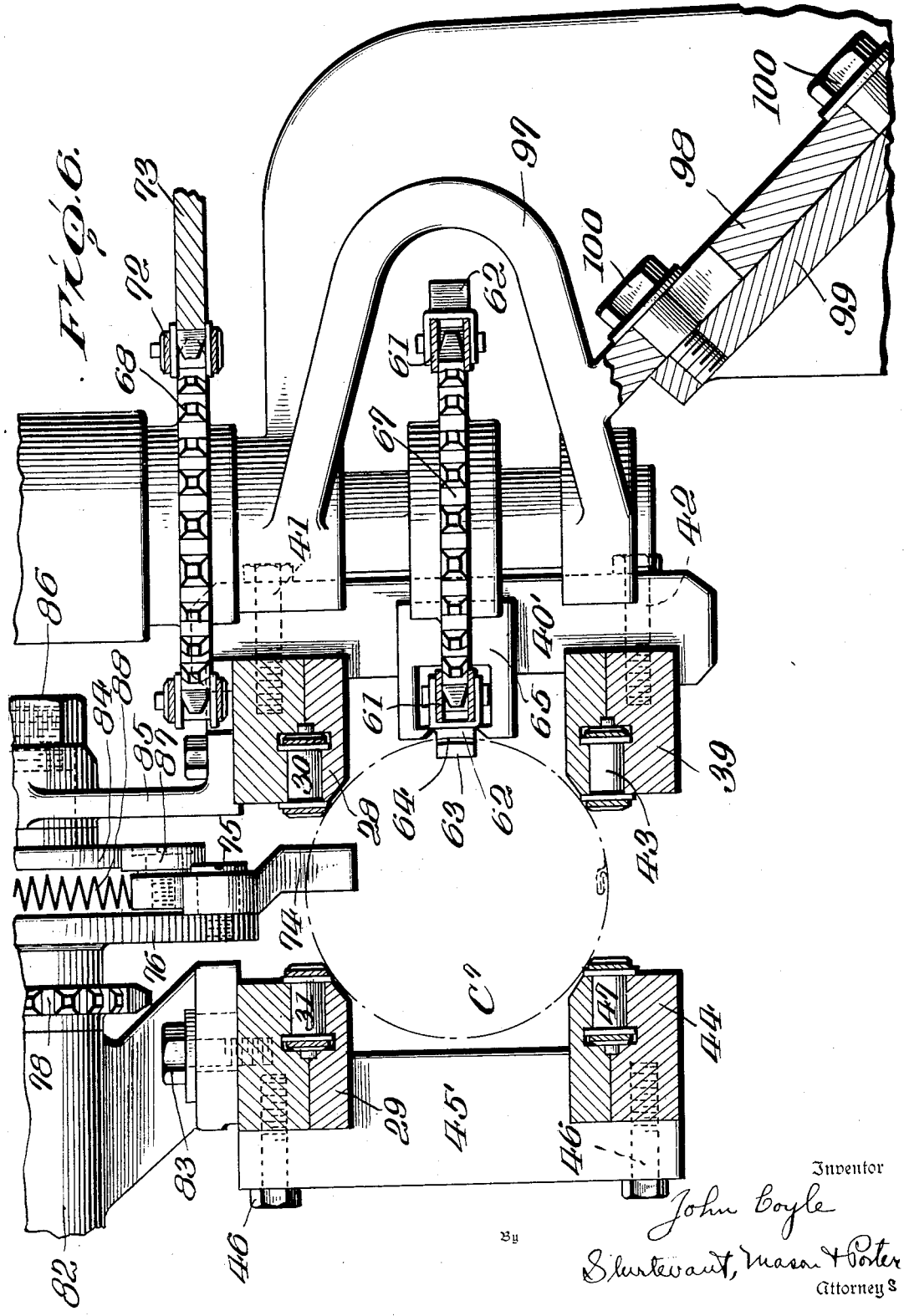

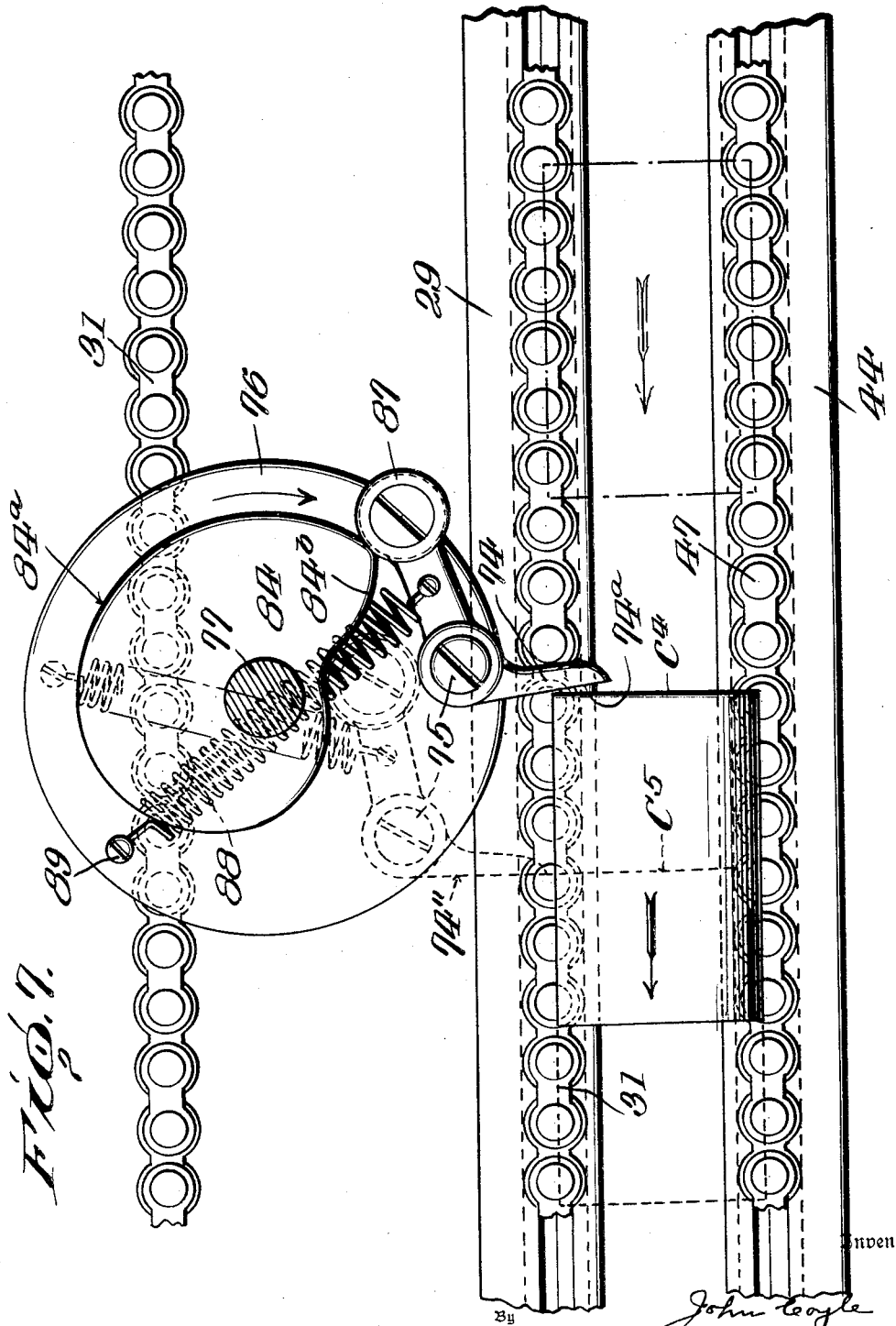

April 24, 1934. J. COYLE 1,956,344
SOLDERING MACHINE
Filed July 26, 1932 10 Sheets-Sheet 10
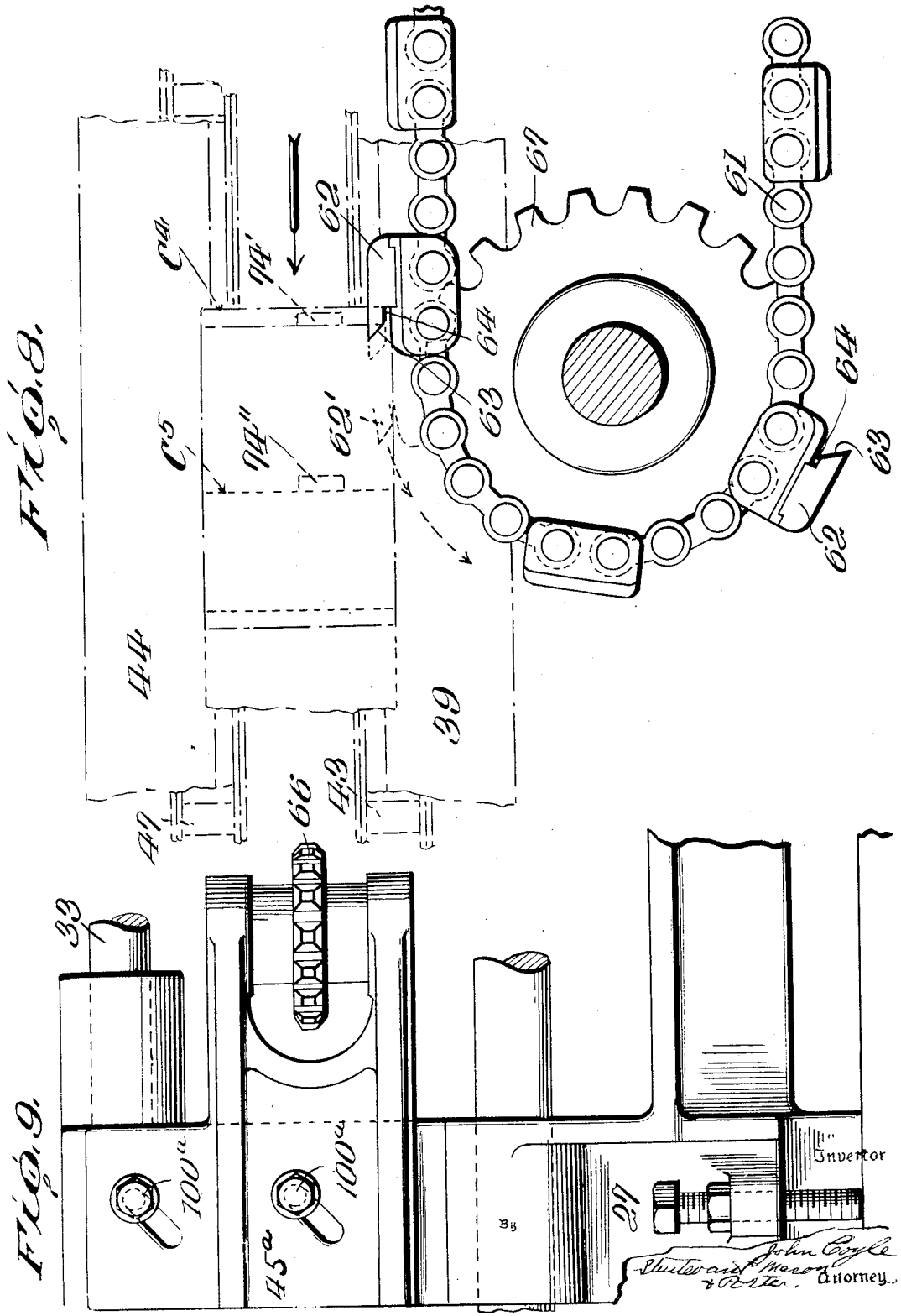

Patented Apr. 24, 1934

1,956,344

UNITED STATES PATENT OFFICE 1,956,344

SOLDERING MACHINE

John Coyle, Baltimore, Md., assignor to Continental Can Company, Inc., New York, N. Y., a corporation of New York Application July 26, 1932, Serial No. 624,867

17 Claims. (Cl. 113—62)

The invention relates to new and useful improvements in soldering machines, and more particularly to a machine for applying solder to the side seam of a can body.

When the can body is presented to the soldering means, the body should be supported so as to present the side seam for proper engagement with the solder applying devices. An inside horse along which the can body slides has been used for supporting and presenting the can body to the solder applying devices. An outside horse has also been used for this purpose, the can bodies sliding along the inside of the horse. This movement of the can body on or in the horse is likely to scrape or injure the surface of the metal, particularly where the can body has been coated with enamel or decorated.

An object of the present invention is to provide a supporting horse for receiving the can bodies and for presenting the same to the solder applying devices, which supporting horse travels continuously with the can body so that there is no movement of the can body on the horse as it passes through the soldering machine.

A further object of the invention is to provide a soldering machine of the above type wherein the traveling horse engages the exterior of the can body only, and supports and presents the same to the solder applying devices.

A still further object of the invention is to provide a soldering machine of the above type with a feeding means which engages the can bodies and times the same into the traveling horse, and wherein said feeding means moves with the traveling horse and maintains the positioning of the can body thereon during the applying of solder to the side seam.

A still further object of the invention is to provide a machine of the above type with means for positively engaging and moving the can bodies free from the feeding means.

A still further object of the invention is to provide a soldering machine of the above type wherein the outside traveling horse consists of traveling chains supported on fixed guideways in the region of the solder applying devices so that said chains may be utilized for supporting and moving the can bodies in a straight line through the soldering region.

These and other objects will in part be obvious and will in part be hereinafter more fully disclosed.

In the drawings which show by way of illustration one embodiment of the invention—

Figure 1 is a side view of the delivering end of the soldering machine;

Fig. 1a is a side view of the central portion of the soldering machine;

Fig. 1b is a side view of the receiving end of the soldering machine;

Fig. 2 is a plan view of the solder bath and the solder applying rolls;

Fig. 3 is a sectional view on the line 3—3 of Fig. 2;

Fig. 4 is a diagrammatic view showing the positioning of a can body over the solder applying rolls;

Fig. 5 is a sectional view on the line 5—5 of Fig. 1a, showing the machine adjusted for a small size cylindrical can body;

Fig. 6 is a view similar to Fig. 5, but showing the machine adjusted for a larger size can body;

Fig. 7 is a detail in side view showing the ejector for stripping the can bodies from the feeding means;

Fig. 8 is a plan view showing more or less diagrammatically the feeding means and the operation of the ejector in the stripping of the can body from the feeding means;

Fig. 9 is a detail showing the supporting bracket for the feed chain at the receiving end of the machine.

The invention has to do with a machine for supplying solder to the side seams of can bodies. It includes a solder applying means which may be of any suitable construction, but preferably of a type for applying the solder to the side seam when the can body is positioned so that the side seam is at the lower side thereof. In the present illustrated embodiment of the invention, this solder applying means includes a solder bath in which are placed a series of solder applying disks arranged in tandem and operating in succession to lift solder from the bath and apply the same to the side seam. These solder applying disks are positively driven, and running in the same bath with the solder applying disks is a disk which engages the solder applied to the side seam for evenly distributing the same and for reclaiming surplus solder. Associated with the solder applying device are the usual pre-heating gas jets for pre-heating the seam preparatory to the applying of solder thereto, and also the usual wiping roll. The present invention has particularly to do with the means for supporting and moving the can bodies through the soldering machine. This supporting means is in the form of an outside horse, and consists of four traveling conveyor chains running in guideways extending through the machine, which guideways support the chains so that each chain travels in a rightline across the solder applying devices. The guideways are in the form of channels receiving the chains, which channels are open at one side so that a portion of the chain projects therefrom for engagement with the can body. Two of these chains are arranged above the center of the can body and two below; likewise two at one side of the center and two at the other. In other words, the chains are preferably spaced about ninety degrees apart around the can body. This not only supports the can body, but holds the can body in its cylindrical shape as the side seam is presented to the solder applying devices. Associated with the traveling horse is a feed chain having gripping members which engage the can bodies and feed the same into the traveling horse in proper timed relation to each other and to the solder applying devices. This feed chain also maintains the can body in a fixed position relative to the traveling horse, so that there is no movement of the can body within the horse. There is also at the discharge end, a traveling ejecting finger which engages the can body and strips it from the gripping device in the feed chain. The upper conveying chains of the traveling horse terminate within the soldering machine, and the can bodies are conveyed to the discharge end thereof by the lower traveling chains.

It is thought that the invention will be better understood by a detail description of the illustrated embodiment thereof. The machine includes bed rails, one of which is indicated at 1 in Figures 1, 1a and 1b. These bed rails are mounted on suitable standards indicated at 2. Mounted on the bed rails is a solder bath indicated at 3. The solder bath includes a supporting frame carrying a tank 4 in which molten solder 5 is maintained. The tank is provided with cross partitions 6, 6, and through each partition is an opening 7. This divides the tank into sections, and in each section is located a solder applying disk. These disks are indicated at 8, 9, 10 and 11. The solder applying disks are mounted on shafts running in bearings carried by the supporting frame of the solder bath. Attached to the outer end of each shaft and located outside of the supporting frame is a driving sprocket. The shafts carrying the solder disks 8 and 10 are provided with a sprocket 12 which has a greater number of teeth therein than the sprockets 13 attached to the shafts carrying the solder applying disks 9 and 11. A driving chain 14 runs over the sprockets 12 and 13 and over an idler sprocket 15. The driving chain is so engaged with the sprockets that the solder applying disks 8 and 10 rotate in a clockwise direction, while the solder applying disks 9 and 11 rotate in a counter-clockwise direction. The sprockets are so proportioned that the disks 8 and 10 turn slower than the disks 9 and 11. In Fig. 4 of the drawings, the solder disks are shown more or less diagrammatically, and the position of the can body as it approaches and leaves these solder applying disks. The disk 8 is provided with three notches $8^a$ or recesses in the peripheral surface thereof. The same is true of the disk 10; it has three notches $10^a$. The disk 9 has two notches $9^a$, and likewise, the disk 11 has two notches $11^a$. The can body indicated at C is moving in the direction of the arrow and is timed so that the peripheral surface of the disk at the rear of the notch $8^a$ will contact with the side seam back from the advance edge thereof. In other words, as the edge of the can body approaches the disk 8, it will be over the recess $8^a$, and this avoids the front end of the can body scraping solder from the solder disk into the inside of the can body. The can body C' is so timed relative to the travel of the disk 9 that the peripheral surface thereof engages the advance end of the side seam so as to apply solder all the way to the end thereof. Inasmuch as this disk is traveling in the same direction as the movement of the can body, solder will not be scraped into the can body. There is no appreciable movement of the can body relative to the solder applying disk. The disk 8 travels at a slower speed, because it is moving in a direction opposed to the travel of the can body. The disk 9 moves at a faster speed, because it is moving in the same direction as the can body, and these speeds are so timed as to bring about a substantial even distribution of solder along the side seam by the contacting solder applying disks.

The can body $C^2$ is shown as just leaving the disk 10. The disk is traveling in a direction opposed to the movement of the can body, and therefore, no solder will be thrown into the can body or scraped therefrom by the can body. The can body $C^3$ is just leaving the disk 11, and the notch $11^a$ is so disposed that the edge of the can is over the notch at the time when the can body leaves the disk. The disk is traveling in the same direction as the can body, and is moving at a greater speed, but inasmuch as the end edge of the side seam is over the notch, no solder will be scraped by the can body on to the interior thereof. The disk 16 runs in the solder bath so that the face thereof is tinned, but the purpose of this disk is to contact with the solder placed on the side seam for distributing and removing some of the surplus solder.

As a means for holding the solder applying disks in alinement, and for shifting the positions thereof, if desired, each shaft carries a collar 17 which engages a recess in a bracket 18, and the bracket 18 is adjustably attached to the frame of the solder bath by bolts 19, 19. By loosening the bolts 19, the bracket may be shifted so as to move the solder rolls into proper alinement with each other and the traveling side seam. The supporting frame for the tank is mounted on adjustable bolts 20, 20 and may be shifted laterally by adjustable bolts 21, 21. Suitable means, of course, is provided for heating the bath. The soldering means per se forms no part of the present invention, but is shown, described and claimed in my co-pending application. It is illustrated in the present application for the purpose of showing one means of applying solder to the side seam of a traveling can body. So far as the present application is concerned, other types of solder applying devices may be used.

In advance of the solder applying means are heating gas burners 22, 22 for pre-heating the side seam preparatory to the applying of the solder thereto. In rear of the solder applying devices is a solder wiper 23 which is mounted on a bracket arm 24 and driven by a belt 25. This is preferably in the form of a felt wheel which contacts with the side seam for re-claiming surplus solder therefrom. This pre-heating means, together with the solder applying means and the solder wiping means, constitutes the active members of the soldering machine. The present invention has particularly to do with the means for supporting the can body and for presenting the can bodies in succession to the pre-heating means, the solder applying devices and the solder wiping means.

Mounted on the bed members 1 are standards 26. At the receiving end of the machine are standards 27. Extending from the standard 26 to the standard 27 are two rails 28 and 29 (see Fig. 5), which form guideways for the traveling chains 30 and 31, respectively. Each guide rail is made in section and is so shaped as to provide a guideway which receives the chain with a portion thereof projecting from the guide rail. These traveling chains consist of a plurality of pivoted links. The chain 30 runs over a sprocket wheel 32 mounted on a shaft 33 and moves into the guideway, traveling along the guideway in the direction of the arrow (Fig. 1b). At the standard 26, the feed chain passes over a sprocket wheel 34 carried by a shaft 35. The chain 30 moves along a guide rail 36 on its return. The chain 31 runs in a similar guideway in the rail 29 and over sprocket wheels on the shafts 33 and 35.

There are standards 37 and 38 carried by the bed which support these upper guide rails and also the guide rail 36. A guide rail 39 similar to the guide rail 28 is supported therefrom by bracket plates 40 which are attached to the respective rails by bolts 41 and 42. This guide rail 39 has a similar guideway therethrough, and a traveling chain 43 passes along said guideway, projecting therefrom as shown in Fig. 5. A guide rail 44 is suspended from the guide rail 29 by similar bracket plates 45 secured to the respective brackets by bolts 46, 46. Traveling in a similar guideway in this guide rail 44 is a chain 47 which projects from the guideway. The can body is indicated at C in Fig. 5, and it will be noted that it is supported by the two lower chains 43 and 47, while the upper chains 30 and 31 contact therewith. The two chains 30 and 31 are above the center of the can, while the chains 43 and 47 are below the center thereof. Likewise the chains 31 and 47 are on one side of the center, while the chains 30 and 43 are on the other side. The chains are disposed substantially ninety degrees apart, and thus not only support the can body, but maintain its cylindrical shape, thus holding the side seam in proper position for contact with the solder applying disks.

Adjacent the receiving end of the machine is a motor M which operates through suitable gearing and a control clutch 48, the shaft 49. This shaft 49 extends along the bed of the machine and carries a bevel gear 50 meshing with a bevel gear 51 carrying a sprocket over which the sprocket chain 52 passes. The sprocket chain runs over a similar sprocket on the shaft 35 and imparts rotation thereto. This is the means for driving both of the upper conveyor chains 30 and 31. The shaft 49 at the rear end of the machine carries a bevel gear 53 which meshes with a bevel gear 54 on a cross shaft carrying sprocket wheels over which the conveyor chains 43 and 47 run. There is a sprocket wheel 55 on the shaft 56 for each conveyor chain 43 and 47. This shaft 56 is mounted in brackets 57 carried by the bed members 1. The conveyor chains 43 and 47 leave their respective guide rails 39 and 44 at the standard 26. These conveyor chains, however, run along guide rails 58, and associated with the guide rails 58 are guide bars 59 so that the can bodies after they pass the standard 26 are supported solely by the conveyor chains 43 and 47 and are carried and discharged from the machine.

The can bodies first pass through a body maker where they are properly shaped and the edge portions thereof hooked and bumped together, thus forming the side seam, preparatory to the soldering of the same. In this body maker, the can bodies travel along a horn 60 and they are fed from this horn into the traveling horse, consisting of the chains 30, 31, 43 and 47. The can bodies are taken from the horn by a feed chain 61. This feed chain 61 is provided with a series of spaced body grippers 62. Each gripper has a tapered finger 63 leading to a recess 64 into which the can body is wedged. These grippers are of the usual character in a feed chain for feeding can bodies. The feed chain travels in a horizontal plane and passes along a guiding channel member 65 (see Fig. 5). The gripper members project from the open side of the channel. The feed chain passes over a sprocket wheel 66 located alongside of the horn 60, and thus it is that this feed chain picks up the can body on the horn delivered thereto by the feeding mechanism of the body maker, and conveys the can body into the traveling horse. The sprocket wheel 66, as shown in Fig. 1b, is in advance of the sprocket wheels carrying the conveyor chains, so that the can body is timed into the traveling chains or horse and placed thereon in a predetermined position. This is essential in the present type of solder applying means where the can body must be properly timed with the notches in the disks which apply solder to the side seam. The conveyor chain travels at the same speed as the supporting chains forming the traveling horse, so that when the can body is placed in the traveling horse, it has no movement relative to the traveling chains forming the horse, and therefore, there will be no scraping of the outside of the can body.

The feed chain 61 at the standard 26 runs over a sprocket wheel 67. This sprocket wheel is carried by a vertical shaft mounted in bearings in the standard, and the shaft carries a sprocket wheel 68. Mounted on the shaft 49 is a bevel gear 69 (see Fig. 1a). This bevel gear meshes with a bevel gear 70 on the vertical shaft 71. The shaft 71 carries a sprocket wheel at the upper end over which a sprocket chain 72 runs. This sprocket chain also runs over a sprocket wheel 68. An idler 73 engages the chain and takes up the slack therein. Thus it is that the feed chain is driven from the shaft 49. The can bodies as they leave the horn 60 are taken by this feed chain, each clamping member on the chain engaging a can body and conveying the same from the horn into the traveling horse, and traveling with the horse holds the can body in a fixed position therein. The clamping devices, as noted above, are timed so as to properly present the can body to the notched solder applying disks when such a form of solder applying mechanism is used. The can bodies are removed from the gripping devices of the feed chain by a traveling ejector 74. This traveling ejector 74 is pivoted at 75 to a disk 76 which is mounted on the shaft 77 and rotates therewith (see Figures 5 and 7). The shaft 77 is provided with a sprocket wheel 78, and this sprocket wheel meshes with the upper run of the traveling chain 31 forming a part of the traveling horse. Idler sprockets 79 and 80 are mounted on a bracket 81 and bear against the conveyor chain 31 and hold the same in engagement with the sprocket wheel 78. The shaft 77 is mounted in a bearing in a bracket 82 which is secured by bolts 83 to the upper guide rail 29, and said bracket may be shifted on the guide rail to properly position the sprocket wheel 78 and the ejecting finger relative to the traveling horse. Associated with the ejector finger is a stationary cam 84. This stationary cam 84 is fixed to a bracket 85 by means of a clamping bolt 86. The cam 84 has a concentric portion 84$^a$ and an eccentric portion 84$^b$. The ejector 74 is provided with a roller 87 which is held in contact with the stationary cam 84 by means of a spring 88 which is attached to the ejector arm and to a lug 89 on a rotating disk supporting the ejector. When the parts are in the position shown in full lines in Fig. 7, the roller is on the concentric portion 84$^a$, and the front face 74$^a$ of the ejector is substantially on a radial line passing centrally through the disk 76. The rotating disk is timed relative to the conveyor chain so that the ejector contacts with the can body just before the roller 87 leaves the concentric portion 84$^a$ of the stationary cam 84. In Fig. 8 of the drawings, the can body is shown in broken lines at C$^4$ when the ejector first contacts therewith. The ejector is moving at a greater speed of travel than the conveyor chain, and when the ejector is moved to the position shown at 74' (Fig. 8) it is beginning to move the can body out of the clamping member 62. The continued movement of the disk carries the roller on to the eccentric portion 84$^b$, which is so shaped as to maintain the front face 74$^a$ substantially perpendicular to the path of travel of the can body, as shown in Fig. 7. When the ejector reaches the position 74'', it has stripped the can body from the gripping member 62 and is moving out of contact with the can body, due to the curved path of travel of the mounting for the ejector on the rotating disk 76. When the ejector has reached the position 74'', the can body is at the position C$^5$ and the gripping member is at the position 62' in Fig. 8.

The rotating disks of the solder applying mechanism receive their movement from a sprocket chain 90 which runs over a sprocket wheel 91 on the shaft carrying the solder applying disk 9. This sprocket chain also runs over a sprocket wheel 92 carried by the shaft supporting the sprocket wheel over which the chain 43 runs.

The belt 25 rotating the shaft carrying the wiper 23 runs over a belt wheel on the shaft 93. This shaft is driven by a belt 94 running over a belt wheel 95 which is carried by a shaft that is rotated through a sprocket wheel connection 96 with the motor M'. The machine lends itself readily to adjustment for different size can bodies. In Fig. 5, the guide rails and feed chain are adjusted for a relatively small size of can body. In Fig. 6, these parts have been adjusted to take care of a larger size can body, which is indicated at C$^7$. The guide rails 28 and 29 are mounted for adjustment toward and from each other so that they may be positioned a greater distance apart when a larger can body is to be operated upon. The brackets 45 are removed and new brackets 45' substituted therefor for supporting the rail 44. Likewise, the brackets 65 are removed and a bracket 65' substituted therefor for supporting the guide rail 39. Other adjustments are made so that the traveling chains forming the horse will be properly operated and guided through these guiding rails in their new set position. It is also necessary to adjust the operating position of the feed chain, and therefore, the vertical shaft carrying the sprocket wheel 67 is mounted for rotation in bearings in a bracket 97 having a base member 98 attached to the frame member 99, so that said base member may be adjusted on the frame member in a direction substantially at 45° to the vertical. Clamping bolts 100, 100 are used for holding the bracket 97 in adjusted positions. When the bracket is lowered from the position shown in Fig. 5 to the position shown in Fig. 6, it not only moves downward but laterally away from the center of the path of travel of the can body, and this positions the feed chain and the gripping members carried thereby so as to properly engage and feed the larger can bodies into the traveling horse. The bracket 45$^a$ supporting the sprocket 66 is also adjustable in an angular direction through the slot and bolt connection 100$^a$, 100$^a$. This bracket 45$^a$ is mounted on the main standard 27.

The operation of the soldering machine is thought to be obvious from the description which has been given. The can bodies are taken by the feed chain from the horn of the body maker and fed into and properly positioned in the traveling horse, and after they are once positioned in the traveling horse, they remain in this fixed position so that there is no slipping of the chains on the can body to scratch the same. There is nothing contacting with the inside of the can body except the inner parts of the gripping members of the feed chain, so that the interior of the can body may be enameled and will be protected against any scratching or injuring of the same during soldering. The outer surface of the can body may also be decorated and will be protected from any scratching or injuring of this decorated surface by reason of the fact that there is no slippage between the supporting devices, and the can body, as the can bodies are conveyed through the soldering machine. The gripping members time the can bodies positively so that they will be properly positioned relative to the notches or recesses in the solder applying disks, and therefore, no solder will be scraped into the can body or thrown into the can body at the rear end thereof during the soldering operation. The can bodies are held rounded and the side seam properly positioned for contact with the soldering disks. The solder after it is applied to the side seam will be distributed by the solder roll running in the solder bath, and surplus solder taken therefrom, after which the can body is presented to the wiper and to the usual cooling means therefor. The ejector contacts with the can body while it is in the traveling horse, and removes the can body from its engagement with the gripping members carried by the feed chain. This occurs after the can body passes the wiper, and before it reaches the end of the traveling horse. The movement of the can body during the releasing of the same from the gripping members is comparatively slight so that the can body is not injured. The upper members of the traveling horse release the can bodies and they are conveyed out of the machine by the lower chains of the traveling horse, which serve purely as conveyor chains for the purpose of discharging the released can bodies.

It is obvious that other types of soldering devices may be used in place of the solder applying disks shown and described. It is essential, however, that the solder applying means shall be of the type whereby solder can be readily supplied to the side seam while arranged at the lower side of the can body during its travel through the soldering machine. By the use of traveling disks such as described, the solder may be applied more efficiently to the side seam, without any solder being forced or thrown into the can body. Furthermore, by the use of the traveling disks there is no tendency to rotate the can body, as sometimes occurs with the ordinary "Jensen" solder roll. There are advantages, however, in the use of applicant's outside horse with the "Jensen" solder roll, and therefore, the invention is not limited to the particular type of solder applying means shown. It is obvious that changes in the details of construction and the arrangement of the parts may be made without departing from the spirit of the invention as set forth in the appended claims.

Having thus described the invention, what I claim as new and desire to secure by Letters-Patent, is—

1. A side seam soldering machine comprising soldering means, an outside supporting horse for supporting and conveying the can bodies, means for moving said supporting horse continuously in a forward direction in the region of the soldering means, and a feeding means traveling with said horse for receiving and timing the can bodies into said traveling horse.

2. A side seam soldering machine comprising soldering means, an outside supporting horse for the can bodies, means for moving said supporting horse continuously in a forward direction in the region of the soldering means, and a feeding means including gripping members for engaging the can bodies and for positively timing said can bodies into said traveling horse.

3. A side seam soldering machine comprising soldering means, an outside supporting horse for the can bodies, means for moving said supporting horse continuously in a forward direction in the region of the soldering means, and a feed chain having gripping members for engaging the can bodies, said chain traveling with said horse whereby said gripping members convey the can bodies into the horse and retain said can bodies in a fixed position on the traveling horse.

4. A side seam soldering machine comprising soldering means, an outside supporting horse for the can bodies, means for moving said supporting horse continuously in a forward direction in the region of the soldering means, a feed chain having gripping members for engaging the can bodies, said chain traveling with said horse whereby said gripping members convey the can bodies into the horse and retain said can bodies in a fixed position on the traveling horse, and means for engaging the can bodies for removing the same from the gripping members after the can bodies have passed the soldering means.

5. A side seam soldering machine comprising soldering means, an outside supporting horse for the can bodies, means for moving said supporting horse continuously in a forward direction in the region of the soldering means, a feed chain having gripping members for engaging the can bodies, said chain traveling with said horse whereby said gripping members convey the can bodies into the horse and retain said can bodies in a fixed position on the traveling horse, a rotating disk, an ejector pivotally mounted on said disk and moving therewith, and a stationary cam adapted to engage said ejector and maintain the forward face thereof substantially vertical while in engagement with the can body, said ejector being positioned and timed so as to engage the can bodies in succession and remove the same from the gripping members on the feed chain.

6. A side seam soldering machine comprising solder applying devices, means for heating the can body prior to the presenting of the same to the solder applying devices, a solder wiping means operating on the can body after it passes the solder applying devices, and a traveling horse extending in a substantially straight line through the heating region, the solder applying region and the solder removing region for receiving and continuously moving the can bodies through this region.

7. A side seam soldering machine comprising solder applying devices, means for heating the can body prior to the presenting of the same to the solder applying devices, a solder wiping means operating on the can body after it passes the solder applying devices, a traveling horse extending in a substantially straight line through the heating region, the solder applying region and the solder removing region for receiving and continuously moving the can bodies through this region, and a feeding means associated with the traveling horse and moving in timing therewith for positively moving the can bodies into contact with the traveling horse and retaining said can bodies in a predetermined position on the traveling horse while the can body is being subjected to the solder applying devices.

8. A side seam soldering machine comprising solder applying devices, traveling chains forming a traveling horse adapted to engage the outer face of the can body, guide rails for supporting said chains in the region of the solder applying devices whereby said chains are caused to travel in right lines, said guide rails being disposed so that the chains contact with the can bodies at points above and below the center of the can body and at each side of the center of the can body, whereby the can bodies are maintained in their cylindrical form and the side seams thereof presented in a fixed line of travel to the solder applying devices.

9. A side seam soldering machine comprising solder applying devices, traveling chains forming a traveling horse adapted to engage the outer face of the can body, guide rails for supporting said chains in the region of the solder applying devices whereby said chains are caused to travel in right lines, said guide rails being disposed so that the chains contact with the can bodies at points above and below the center of the can body and at each side of the center of the can body, whereby the can bodies are maintained in their cylindrical form and the side seams thereof presented in a fixed line of travel to the solder applying devices, and a feed chain having gripping members traveling at the same speed as the traveling chains for receiving and timing the can bodies into the traveling horse.

10. A side seam soldering machine comprising solder applying devices, traveling chains forming a traveling horse adapted to engage the outer face of the can body, guide rails for supporting said chains in the region of the solder applying devices whereby said chains are caused to travel in right lines, said guide rails being disposed so that the chains contact with the can bodies at points above and below the center of the can body and at each side of the center of the can body, whereby the can bodies are maintained in their cylindrical form and the side seams thereof presented in a fixed line of travel to the solder applying devices, a feed chain having gripping members traveling at the same speed as the traveling chains for receiving and timing the can bodies into the traveling horse, and an ejector moving at a greater speed than the feed chain adapted to engage the can bodies and strip the same from the gripping members.

11. A side seam soldering machine comprising solder applying means, guide rails extending throughout the length of the solder applying means parallel with the soldering line of said solder applying means and having channels open at one side of the rails, traveling chains movable through said guide rails with portions of the chains projecting from the channels, said guide rails and chains being disposed so as to form an outside traveling horse adapted to receive and support can bodies and present the same to the solder applying means.

12. A side seam soldering machine comprising solder applying means, guide rails extending throughout the length of the solder applying means parallel with the soldering line of said solder applying means and having channels open at one side of the rails, traveling chains movable through said guide rails with portions of the chains projecting from the channels, said guide rails and chains being disposed so as to form an outside traveling horse adapted to receive and support can bodies and present the same to the solder applying means, means for moving said chains continuously, and a feed chain traveling in timing therewith for engaging the can bodies and delivering the same into said outside horse whereby said can bodies in their travel through the soldering means have no movements relative to the soldering horse or feed chain.

13. A side seam soldering machine comprising solder applying means, guide rails extending throughout the length of the solder applying means parallel with the soldering line of said solder applying means and having channels open at one side of the rails, traveling chains movable through said guide rails with portions of the chains projecting from the channels, said guide rails and chains being disposed so as to form an outside traveling horse adapted to receive and support can bodies and present the same to the solder applying means, and a traveling feed chain extending throughout the solder applying region and having gripping members for engaging can bodies, said feed chain traveling in timing with the horse so as to maintain the can bodies in a predetermined fixed position on the traveling horse while presenting the same to the solder applying means.

14. A side seam soldering machine comprising solder applying means, guide rails extending throughout the length of the solder applying means parallel with the soldering line of said solder applying means and having channels open at one side of the rails, traveling chains movable through said guide rails with portions of the chains projecting from the channels, said guide rails and chains being disposed so as to form an outside traveling horse adapted to receive and support can bodies and present the same to the solder applying means, a traveling feed chain extending throughout the solder applying region and having gripping members for engaging can bodies, said feed chain traveling in timing with the horse so as to maintain the can bodies in a predetermined fixed position on the traveling horse while presenting the same to the solder applying means, an ejector, a rotating disk on which said ejector is mounted, a stationary cam cooperating with said ejector for maintaining the forward face thereof substantially vertical while contacting with the can bodies, and means for rotating said disk so as to cause said ejector to travel at a faster speed than the gripping members for contacting with the can bodies and stripping the same from said gripping members.

15. A side seam soldering machine comprising solder applying devices, heating means for pre-heating the side seam preparatory to applying solder thereto, a solder wiper, traveling chains movable through the soldering machine from one end thereof to the other and spaced from each other for supporting a can body and presenting the same in succession to the pre-heating means, the solder applying means and the solder wiper, means for guiding and supporting said traveling chains in the region of the pre-heating and solder applying devices so that the can bodies will move in a straight line, and means for retaining said can bodies on said traveling chains.

16. A side seam soldering machine comprising solder applying devices, heating means for pre-heating the side seam preparatory to applying solder thereto, a solder wiper, traveling chains movable through the soldering machine from one end thereof to the other and spaced from each other for supporting a can body and presenting the same in succession to the pre-heating means, the solder applying means and the solder wiper, means for guiding and supporting said traveling chains in the region of the pre-heating and solder applying devices so that the can bodies will move in a straight line, and traveling chains spaced from each other and adapted to engage the can bodies at the upper side thereof for holding said can bodies on said first-named traveling chains, and means for supporting and guiding said last-named chains in the region of the pre-heating and solder applying devices.

17. A side seam soldering machine comprising solder applying devices, heating means for pre-heating the side seam preparatory to applying solder thereto, a solder wiper, traveling chains movable through the soldering machine from one end thereof to the other and spaced from each other for supporting a can body and presenting the same in succession to the pre-heating means, the solder applying means and the solder wiper, means for guiding and supporting said traveling chains in the region of the pre-heating and solder applying devices so that the can bodies will move in a straight line, traveling chains spaced from each other and adapted to engage the can bodies at the upper side thereof for holding said can bodies on said first-named traveling chains, means for supporting and guiding said last-named chains in the region of the preheating and solder applying devices, and a feed chain traveling in a horizontal plane and having gripping members adapted to engage the can bodies between the upper and lower traveling chains and moving in timing therewith for receiving and timing the can bodies on to said chains.

JOHN COYLE.